June 24, 1941.                L. R. TWYMAN                2,247,141
                           MULTIPLE VALVE BANK
                         Filed April 15, 1938         3 Sheets-Sheet 2
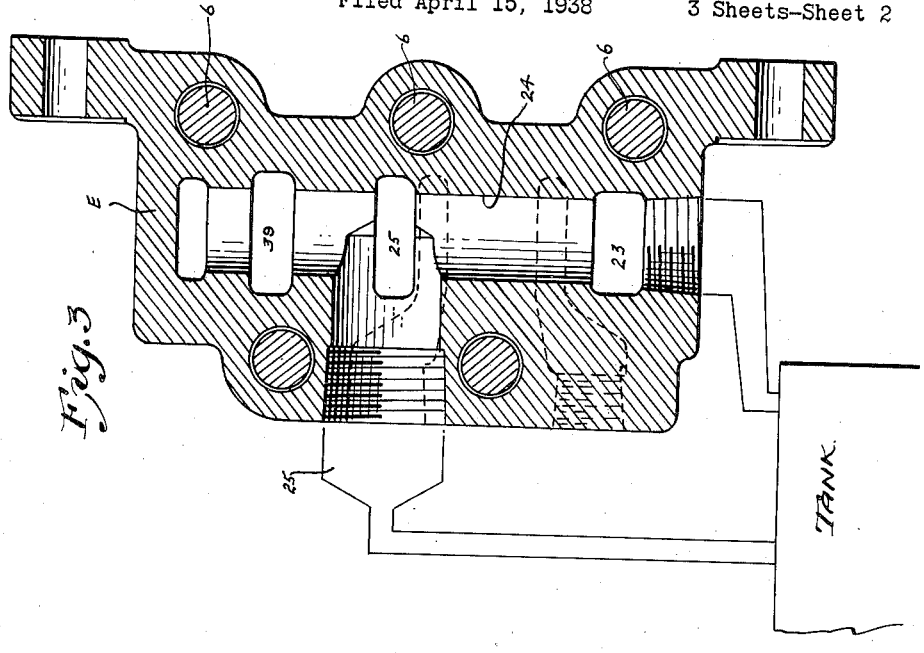
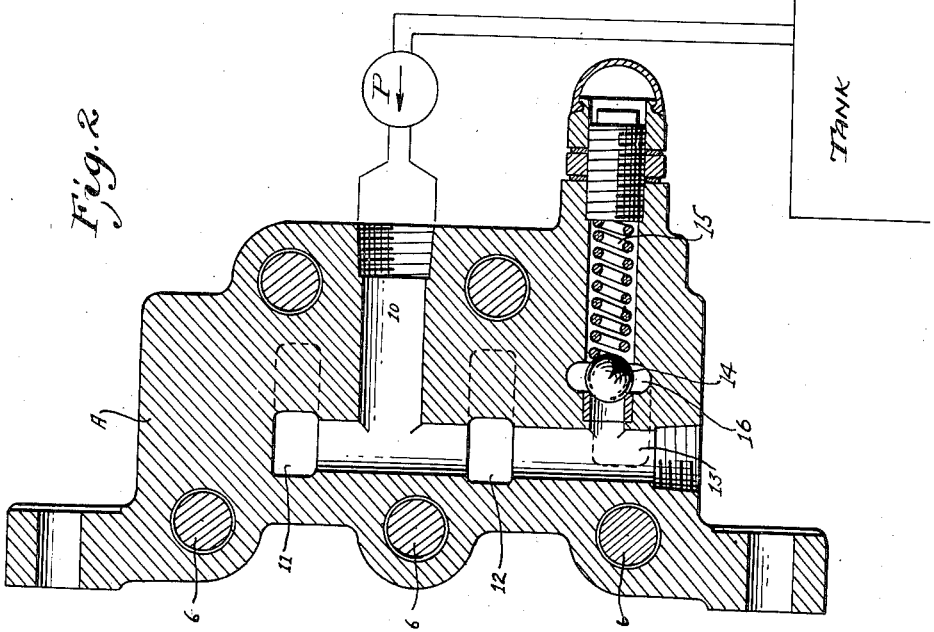
INVENTOR.
L. RAYMOND TWYMAN
BY Barnes, Kisselle, Laughlin & Raisch
ATTORNEY.

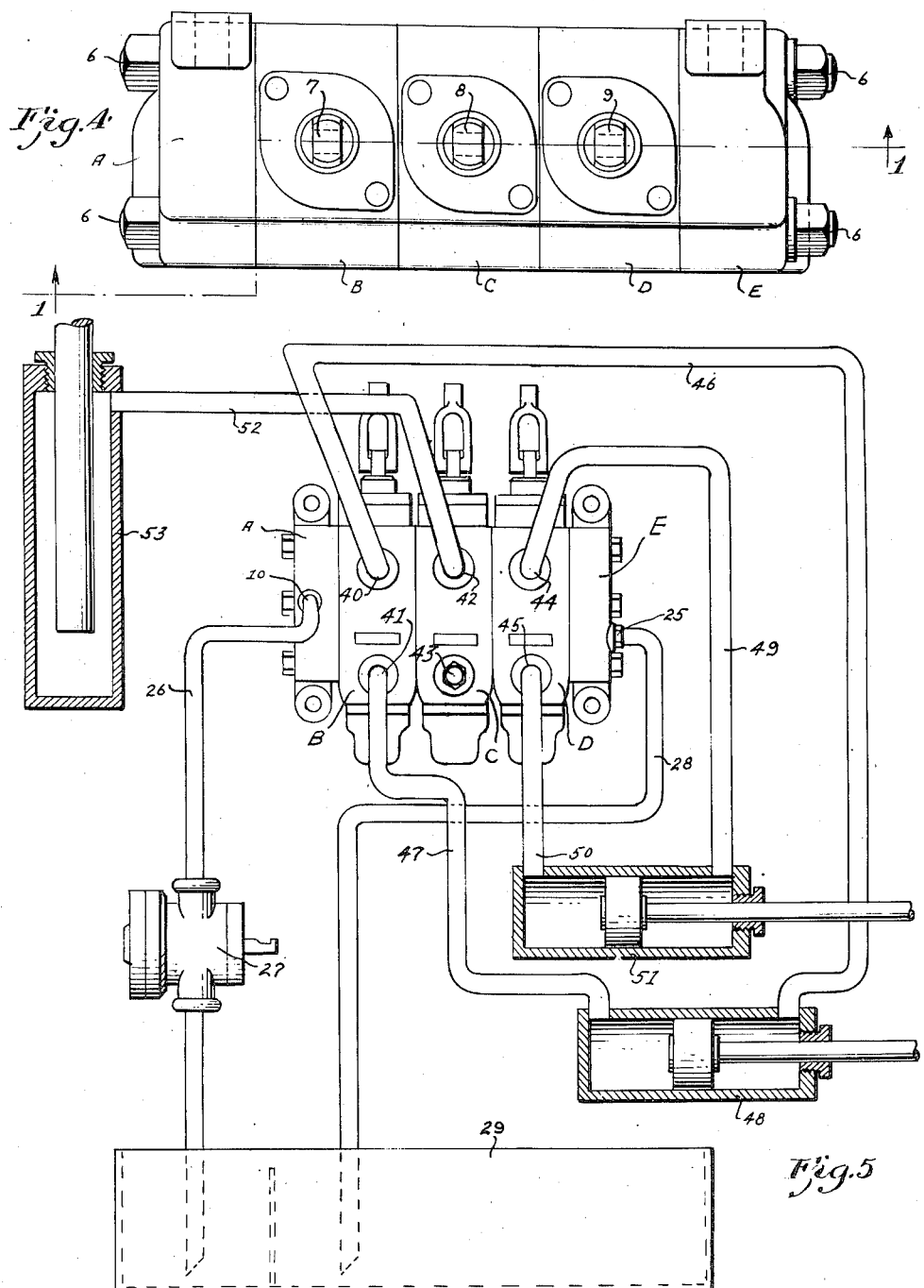

Patented June 24, 1941

2,247,141

UNITED STATES PATENT OFFICE 2,247,141

MULTIPLE VALVE BANK

L Raymond Twyman, Detroit, Mich., assignor to Vickers, Incorporated, Detroit, Mich., a corporation of Michigan Application April 15, 1938, Serial No. 202,294

16 Claims. (Cl. 303—6)

This invention relates to a multiple valve bank and more particularly to fluid selector valves for single and double acting hydraulic motors especially adapted for use on snow-plows and other road machinery where simultaneous manual control of several different hydraulic appliances is often necessary.

This invention further relates to valve units which are adapted to be mounted directly adjacent each other in any sequence in a bank, said units being designed such that they may be interchanged or added or subtracted from the bank at will.

The object of the present invention is to provide a valve bank having valve housings adapted to serve as either single or double acting valves depending on the type of valve spool used therein. A further object is to provide a "float" position valve having a solid valve spool and an extremely simple housing arrangement.

Another feature of the invention resides in the design of the valve housings and valve spools whereby said valves may be manipulated to provide simultaneous movement of two or more controlled motors at one time.

In the drawings:

Fig. 2 is a sectional view of a pump connection plate taken on the line 2—2 of Fig. 1.

Fig. 3 is a sectional view of a tank plate taken on the line 3—3 of Fig. 1.

Fig. 4 is a plan view of the assembled unit, and

Fig. 5 is a view of a hydraulic system containing a double acting and single acting hydraulic motors and a control valve bank.

Figure 1:
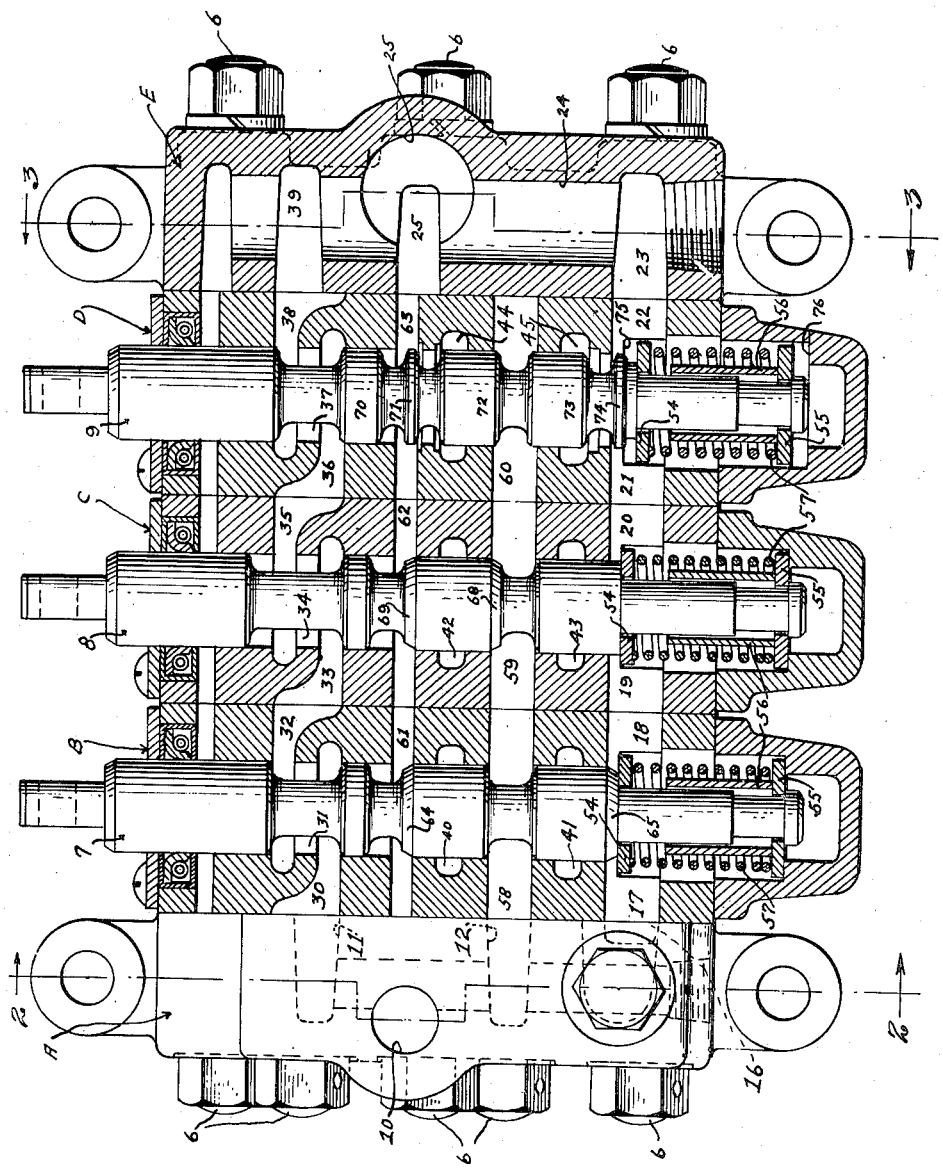
Fig. 1 is a sectional view of a mutliple valve unit showing a double acting, a single acting, and float position valve in series with end plates at each end of a valve bank, one of said end plates including an overload relief valve.

The principles of the invention are described in the following specification in connection with a double acting control valve, a single acting control valve and a double acting control valve having a float position. It will be understood that any number of valves of the type before mentioned, could be placed in any sequence in a control valve bank and that the disclosure is being confined to the three types of valves for the sake of simplicity only. Referring to Fig. 1, a control valve bank is shown which is made up of a pump connection plate A, a double acting valve B, a single acting valve C, a double acting float position valve D, and a tank connection plate E. The above housings are held together by bolts 6. Valves B, C and D are provided with longitudinally cylindrical recesses in which are disposed valve spools 7, 8 and 9 respectively. Each of the elements of the valve bank are provided with ports and passageways for pressure and exhaust liquid which can best be described by referring to the operation of the valve bank in a hydraulic system. The housing A is provided with a pressure opening 10 which leads to ports 11, 12 and 13. The port 13 is a relief valve port opening to a spring pressed ball 14 backed by a spring 15, the tension of which may be adjusted to determine the maximum pressure in the system. Upon the opening of the valve 14 pressure will flow to the tank from port 10 through ports 13 and a port 16 which is connected to the tank through ports 17 to 23 in the housings B, C, D and E, the latter port 23 being in the tank connection plate E which is provided with a central passageway 24 which opens to the tank through a part 25.

A conduit 26 connects a pump 27 to the pressure connection plate A and a conduit 28 connects the tank port 25 and the plate E to a tank 29.

With the valves 7, 8 and 9 in neutral position, as shown in Fig. 1, the part 11 in the pressure plate A is open to the tank port 25 through passageways 30 to 39 in the housings B, C, D and E respectively. The passageway or port 39 is connected by the opening 24 to the tank port 25. Each of the housings B, C and D are provided with two motor ports, the housing B having motor ports 40 and 41, the housing C having motor ports 42 and 43, and the housing D having motor ports 44 and 45. The ports 40 and 41 of the housing B are connected by conduits 46 and 47 to a double acting motor 48 (Fig. 5); likewise, the ports 44 and 45 of the housing D are connected by conduits 49 and 50 to a motor 51. The port 42 of the single acting control valve C is connected by conduit 52 to a single acting motor 53, while the port 43 of the valve housing C is plugged. This plug 43 constitutes the only difference between a single and double acting valve housing.

Each of the valve spools 7, 8 and 9 are provided with washers 54 and 55, a spacer 56 adapted to limit the movement of each spool, and a spring 57 adapted to center the valve spools in neutral position. An operator desiring to admit pressure to the right end of the motor 48 may do so by lifting the valve spool 7 against the spring 57 thereby admitting pressure from the port 12 of the tank plate A to the part 40 through a transverse passageway 58 in the housing B. Similar passageways 59 and 60 are found in the housings C and D. This lifting of the valve spool 7 will close the passageway 31 and thus close the by-pass course from pressure port 11 to tank port 39 thereby allowing pressure to build up in the pressure port 12. With the valve spool 7 in position to admit pressure to the port 40, the motor port 41 will be open to the tank through passageways 18 to 24. Similarly by shifting the valve spool downwardly the port 40 may be open to the tank port 25 through transverse passageways 61, 62 and 63, and the motor port 41 will be open to pressure port 12 through the passage 58. The valve spool 7 is provided with tapers 64 and 65 to permit a metering of the liquid from the motor ports to the tank outlets thereby affording a positive control of the speed of the motors. It will be noticed that when the valve spool 7 is shifted to admit pressure to either of the motor ports 40 or 41 that the passageway 31 of the housing B is blocked thereby cutting off the port 11 in the housing A from the tank.

The control valve C, adapted to regulate the action of the single acting motor 53, has a housing which is identical with the housing B except that the lower motor port 43 is plugged. The valve spool 8 is slightly different in its configuration from that of the valve spool 7 but the action is much the same. For example, when the valve spool 8 is raised, the port 42 and conduit 52 are open to pressure through the passageways 59 and 58, and when valve spool 8 is shifted downwardly from its neutral position in Fig. 1 the motor port 42 is open to the tank port 25 through the passageways 62 and 63 in the housings C and D. It will be seen that the by-pass course formed by passageways 30 to 38 from port 11 in the housing A to the port 39 in the housing E leading to the tank, is closed by the valve spool 8 at the port 34 only when the valve spool is shifted upwardly to admit pressure to the port 42, thus permitting pressure to build up in port 12 at the proper time. Tapers 68 and 69 on the valve spool 8 permit more accurate control of pressure to and from the motor 53.

The valve housing D with the valve spool 9 is designed to control a double acting motor 51 and to permit a float position of the piston in said motor. The housing D is identical with the housings B and C except for a slight configuration in the valve recess between the motor port 44 and the tank passageway 63 and between the motor port 45 and the tank passageways 21 and 22. The valve spool 9 is provided with piston formations 70 to 74 inclusive, the function of which will be later described. The lower portion of the valve spool 9 is formed in such a manner that the washers 54 and 55 are spaced from shoulders 75 and 76 of the housing D when the valve spool 9 is in neutral position. This arrangement permits moving of the spool 9 a given distance in either direction without compressing the spring 57.

As shown in Fig. 1 the valve spool 9 is in neutral float position whereby fluid may pass from the annular motor port 44 to the tank passageway 63 and from the motor port 45 to the tank passageways 21 and 22. The valve spool 9 may be shifted to a position whereby the fluid is locked in the motor 51 by shifting the valve spool 9 down so that washer 55 contacts the shoulder 76. In this position the piston 71 will block the passageway between motor port 44 and tank passageway 63 and the piston 73 will block the passageway between motor port 45 and tank passageways 21 and 22. Similarly, shifting of the valve spool 9 upward so that the washer 54 contacts the shoulder 75 will place the valve in a position where the piston 74 will lock the motor port 45 and the piston 72 will lock the motor port 44. Actuation of the motor 51 can be accomplished by shifting of the valve spool 9 upward or downward to its extreme position whereby the closing of the port 37 will block the by-pass course from pressure port 11 to the tank, and the movement of the pistons 72 and 73 will admit pressure from the passageway 60 to the motor ports 44 or 45 respectively. It will be understood that, as was the case with valve B, the connecting of one motor port to pressure is simultaneous with the connection of the other motor port to the tank connection.

It should be noticed that the design of the valve D in connection with valve spool 9 permits a float position with a valve which has a solid piston. This is in contrast to previous float position valves which have needed an axial passageway to perform the necessary functions.

What I claim is:

1. A multiple valve bank comprising a plurality of abutting valve housings each provided with a longitudinal valve recess for receiving a slidable valve member and having three spaced straight transverse passageways therethrough, and a fourth substantially transverse passageway through each of said valve housings made up of two smaller passageways on opposite sides of said housing connected by said valve recess, said transverse passageways being arranged to form continuous passageways through a plurality of abutting housings, each of said housings being also provided with cylinder ports communicating with said valve recess, a slidable valve member in each of the valve recesses, each member having restricted portions located substantially at each of said respective transverse passageways when said valve members are in neutral position, and an end plate at each end of said abutting valve housings, one plate connecting three of said continuous transverse passageways to a pressure opening at one end, and the other plate connecting three of said continuous passageways to a tank opening at the other end.

2. A multiple valve bank comprising a plurality of abutting valve housings each provided with a longitudinal valve recess for receiving a slidable valve member and having three spaced straight transverse passageways therethrough, and a fourth transverse passageway through each of said valve housings made up of two smaller passageways on opposite sides of said housing connected by said valve recess, said transverse passageways being arranged to form continuous passageways through a plurality of abutting housings, each of said housings being also provided with cylinder ports communicating with said valve recess, a slidable valve member in each of the valve recesses, each member having restricted portions located substantially at each of said respective transverse passageways when said valve members are in neutral position, and end plates at each end of said abutting valve housings adapted to serve as pressure and tank connections for the passageways of said housings.

3. A multiple valve bank comprising a plurality of abutting valve housings each provided with a longitudinal valve recess for receiving a slidable valve member and having three spaced straight transverse passageways therethrough, and a fourth transverse passageway through each of said valve housings made up of two smaller passageways on opposite sides of said housing connected by said valve recess, said transverse passageways being arranged to form continuous passageways through a plurality of abutting housings, each of said housings being also provided with cylinder ports communicating with said valve recess, a slidable valve member in each of said valve recesses for directing fluid to and from said cylinder ports and passageways, and end plates at each end of said abutting valve housings adapted to serve as pressure and tank connections for the passageways of said housings.

4. A multiple valve bank comprising a plurality of abutting valve housings each provided with a longitudinal valve recess for receiving a slidable valve member and having three spaced straight transverse passageways therethrough, and a fourth transverse passageway through each of said valve housings made up of two smaller passageways on opposite sides of said housing connected by said valve recess, said transverse passageways being arranged to form continuous passageways through a plurality of abutting housings, each of said housings being also provided with cylinder ports communicating with said valve recess, a slidable valve member in each of said valve recesses for directing fluid to and from said cylinder ports and passageways, and an end plate at each end of said abutting valve housings, one plate connecting three of said continuous transverse passageways to a pressure opening at one end, and the other plate connecting three of said continuous passageways to a tank opening at the other end.

5. A valve structure adapted to be used as a control valve comprising a housing having a longitudinal valve member recess with a plurality of transverse pressure and exhaust passageways and motor ports opening to said valve member recess, and a solid valve member slidable in said recess having annular grooves arranged such that movement of said member will connect said motor ports respectively to a pressure passageway and an exhaust passageway, said housing being adapted to control a single acting, double acting, or float position cylinder and being adapted to be mounted in a valve bank adjacent identical housings whereby said passageways register to form continuous passageways through said bank.

6. A valve structure adapted to be used in a multiple unit valve bank comprising a housing having a longitudinal valve recess, a plurality of motor ports, and a plurality of transverse passageways comprising a pressure passageway, tank passageways, and a bypass passageway, said housing being designed to be mounted in abutting relation with identical housings whereby said transverse passageways register to form continuous passageways, and a series of valve members to be used in said valve housing, one of said members being arranged to control a double acting motor and designed such that movement thereof will close said bypass passageway, open one motor port to a tank passageway, and open the other motor port to the pressure passageway, a second member arranged to control a single acting motor and designed such that movement thereof in one direction will connect a motor port with a tank passageway and movement in the other direction will connect said motor port with the pressure passageway, and a third member arranged to control a double acting motor and provide a float position therefor, said member being arranged to open both motor ports to a tank passageway when in neutral position.

7. In combination with a pressure source, a series of pressure operated instrumentalities comprising a double-end cylinder, a single-end cylinder, and a float-position, double-end cylinder, a fluid reservoir, and suitable fluid lines, a bank of operating valves comprising a group of substantially identical valve housings, each of said housings having a plurality of transverse passageways comprising a pressure passageway, tank passageways, and a by-pass passageway, said housing being designed to be mounted in abutting relation with identical housings to form continuous passageways in a multiple unit, and each of said housings having unconnected cylinder ports adapted to be connected alternately to pressure and tank passageways, and a plurality of valve members, one for each of said housings and each having varied formations whereby one is movable to alternately connect opposite ends of the double-end cylinder to pressure and tank passageways, another is movable to connect one end of said single-end cylinder alternately to pressure and tank passageways, and a third is movable to alternately connect opposite ends of a double-end cylinder to pressure and tank passageways and to connect both ends of said cylinder to tank passageways when in neutral position.

8. A multiple valve bank comprising a plurality of abutting valve housings each provided with a longitudinal valve recess for receiving a slidable valve member and having three spaced straight transverse passageways therethrough, and a fourth transverse passageway through each of said valve housings made up of two smaller passageways on opposite sides of said housing connected by said valve recess, said transverse passageways being arranged to form continuous passageways through a plurality of abutting housings, each of said housings being also provided with cylinder ports communicating with said valve recess.

9. A valve structure adapted to be used in a multiple unit valve bank comprising a housing having a longitudinal valve recess, a plurality of motor ports, and a plurality of transverse passageways comprising a pressure passageway, tank passageways, and a by-pass passageway, said housing being designed to be mounted in abutting relation with identical housings whereby said transverse passageways register to form continuous passageways in a multiple unit, and a solid cylindrical valve member to be slidably mounted in said valve recess, said member having annular grooves so spaced as to provide a float position valve wherein at neutral position of said member, said motor ports are each connected to a tank passageway, and at either extreme position said valve opens one motor port to the pressure passageway and the other motor port to a tank passageway.

10. A valve structure to be used as a control valve comprising a housing having a longitudinal valve member recess with a plurality of transverse pressure and exhaust passageways and motor ports opening to said valve member recess, and a solid valve member slidable in said recess having annular grooves arranged such that movement of said member will connect said motor ports respectively to a pressure passageway and an exhaust passageway, said housing being adapted to control a single acting, double acting, or float position motor by utilizing valve members having differently spaced annular grooves, said housing being also adapted to be mounted in a valve bank adjacent identical housings whereby said passageways register to form continuous passageways through said bank.

11. A control valve structure comprising two identical housings, each having a longitudinal valve recess with a plurality of transverse pressure and exhaust passageways so spaced and arranged as to cooperate with each other to form continuous passageways through said structure, one housing having a motor port connected to a single acting motor, and the other housing having motor ports connected to a double acting motor, a valve member in said first housing having annular parts spaced to direct liquid to and from said single acting motor, and a valve member in said other valve housing having annular parts spaced to direct liquid to and from said double acting motor, said valve members being changeable in the housings to accomplish the said control functions in either.

12. A control valve structure comprising two identical housings, each having a longitudinal valve recess with a plurality of transverse pressure and exhaust passageways so spaced and arranged as to cooperate with each other to form continuous passageways through said structure, one of said housings being adapted to control a single acting motor and the other a double acting motor by utilizing valve members having differently spaced annular grooves, said valve members being interchangeable in the housings to accomplish the said control functions in either housing.

13. A control valve structure comprising two identical housings, each having a longitudinal valve recess with a plurality of transverse pressure and exhaust passageways so spaced and arranged as to cooperate with each other to form continuous passageways through said structure, one of said housings being adapted to control a single acting motor and the other a double acting motor by utilizing valve members having differently spaced annular grooves, said valve members being interchangeable in the housings to accomplish the said control functions in either housing, said housings having by-pass passageways extending therethrough and arranged to be separated by the double-acting valve member in each of two positions thereof and by the single-acting valve member in only one position thereof.

14. A control valve structure comprising a valve body adapted to control a double-acting motor when mounted in a valve bank having end plates with inlet and outlet connections therein, a longitudinal valve recess therein with a plurality of transverse pressure and exhaust passageways and with a pair of motor ports, and a five-position valve spool in said bore and arranged in its mid position to connect both motor ports with a relief passage and in its extreme positions to connect the motor ports, respectively, one with a pressure passage and the other with a relief passage or vice versa, said spool and ports being arranged to provide two intermediate positions in each of which at least one motor port is blocked.

15. A control valve structure comprising a valve body adapted to control a double-acting motor when mounted in a valve bank having end plates with inlet and outlet connections therein, a longitudinal valve recess therein with a plurality of transverse pressure and exhaust passageways and with a pair of motor ports, and a five-position valve spool in said bore and arranged in its mid position to connect both motor ports with a relief passage and in its extreme positions to connect the motor ports, respectively, one with a pressure passage and the other with a relief passage or vice versa, said spool and ports being arranged to provide two intermediate positions in each of which at least one motor port is blocked, and spring means for biasing the valve spool from either extreme position to an adjacent intermediate position but no farther.

16. A control valve structure comprising a valve body adapted to control a double-acting motor when mounted in a valve bank having end plates with inlet and outlet connections therein, a longitudinal valve recess therein with a plurality of transverse pressure and exhaust passageways and with a pair of motor ports, and a five-position valve spool in said bore and arranged in its mid position to connect both motor ports with a relief passage and in its extreme positions to connect the motor ports, respectively, one with a pressure passage and the other with a relief passage or vice versa, said spool and ports being arranged to provide two intermediate positions in each of which at least one motor port is blocked, and by-pass passageways extending through the housing and bore and means on said spool for blocking said by-pass only in the extreme positions of the spool.

L RAYMOND TWYMAN.